United States Patent [19]

Sato et al.

[11] 4,206,161
[45] Jun. 3, 1980

[54] METHOD OF PRODUCING RESIN POWDER

[75] Inventors: Hiroshi Sato, Iwakura; Kohei Katoh, Kasugai; Rihei Tomida; Kazuo Kaneko, both of Komaki; Kiichi Masago, Kohnan; Norio Kawabata, Kagamigahara; Kiyoshi Okuda, Iwakura, all of Japan

[73] Assignee: Dai Nippon Toryo Co., Ltd., Osaka, Japan

[21] Appl. No.: 841,713

[22] Filed: Oct. 13, 1977

[30] Foreign Application Priority Data

Oct. 18, 1976 [JP] Japan .................................. 51-124613
May 31, 1977 [JP] Japan ................................... 52-63871
Sep. 2, 1977 [JP] Japan ............................ 52-118354[U]

[51] Int. Cl.² ............................................... B01J 2/06
[52] U.S. Cl. ........................................ 264/11; 264/101
[58] Field of Search ................................. 264/11, 101

[56] References Cited

U.S. PATENT DOCUMENTS

| 3,737,401 | 6/1973 | Tsou et al. ........................ 260/37 R |
| 3,891,730 | 6/1975 | Wessel et al. ......................... 264/11 |
| 3,961,007 | 6/1976 | Caputi et al. ......................... 264/11 |
| 4,013,744 | 3/1977 | Kuerten et al. ....................... 264/11 |
| 4,087,498 | 5/1978 | Young ................................... 264/11 |

*Primary Examiner*—Donald J. Arnold
*Assistant Examiner*—James R. Hall
*Attorney, Agent, or Firm*—Bucknam and Archer

[57] ABSTRACT

A method of producing resin powder in which a resin solution prepared by dissolving a resin in a water-miscible solvent is sprayed from a nozzle while spraying water from another nozzle located close to the first-said nozzle so as to form fine emulsified droplets of said resin solution in water, then at least a substantial portion of the water-miscible solvent in said emulsified droplets is rapidly transferred into water to produce a suspension of resin powder. The suspension is then filtered. Apparatus for practicing this method is also provided.

11 Claims, 14 Drawing Figures

(a) (b) (c) (d)

(a)

(b)

METHOD OF PRODUCING RESIN POWDER

BACKGROUND OF THE INVENTION

(1) Field of the Invention

This invention relates to a method of producing resin powder and an apparatus therefor, and more particularly, to a method of and an apparatus for continuous production of synthetic resin powder which exhibits a uniform particle size distribution. According to the invention, it is possible to obtain powdered resin with a small average particle size.

Powdered resin, particularly colored powdered resin, has a wide variety of uses including, for example, the easy dispersed pigments, colored plastic pellets, powder coating materials or slurry paints formed from a powdered resin with a particle size of 1 to 80μ dispersed in an aqueous medium. Of particular importance is the fact that powder and slurry paints or coating materials contain no organic solvent, and that the powder paints can be recovered for reuse in the painting operation and have in recent years been utilized in ever increasing amounts. On the other hand, the slurry paints are free of any danger of explosion and fire and may be used with any ordinary type of coating apparatus for liquid coatings. It is expected that such slurry paints or coating materials will find a wider range of practical application, and that they will come into greater demand in the future.

(2) Description of the Prior Art

For production of (colored) powdered reesin, there has generally been employed a method in which solid resin as it is or after being mixed with an additive or additives such as pigment, curing agent, etc., by hot melting, is powdered by a mechanical means. However, difficulties are experienced in controlling the powdered particle size and its distribution. In addition, the particles produced are angular in shape and hence the resin particles are poor in physical properties such as their flow characteristics and are inconvenient to handle.

When mixing the additives by hot melting, the following problems were encountered:

(1) The thermosetting resins which are reacted and cured at low temperatures are unusable as they are gelled by the treatment.

(2) Color matching is relatively difficult and time consuming.

(3) As the additives such as pigment, curing agent, etc., cannot be dispersed sufficiently in resin, the coating films or the articles coated by using the colored powdered resin obtained from this method render an unattractive finished surface with insufficient smoothness and distinctness-of-image gloss.

As an improvement over this conventional method, a spray drying technique has been proposed (for example, U.S. Pat. No. 3,561,003). According to this technique, the solution prepared by dissolving solid resin in an organic solvent and, if need be, further adding a pigment is spray-dried after dispersing the pigment (in case it is added) to a predetermined range of particle sizes by a known dispersing machine of the type commonly used in production of coating materials.

This spray drying machine, however, still has some serious disadvantages. For instance, as the resin solution is sprayed into the air and dried, the obtained resin particles prove to be very porous, resulting in reduced bulk specific gravity, due to, for one thing, evaporation of the solvent. In addition, air is trapped in the particle pores, so that when such particles are used for coating, the formed coating film may undergo foaming or expansion to roughen its surface.

Further, for instantaneous drying of the droplets of the resin solution formed by spraying, the droplets must be contacted with hot air of a temperature higher than the boiling point of the solvent at the same time that spraying is conducted. This involves a high danger of fire or explosion in the production process. These problems still remain unsolved.

As a further improvement over these conventional methods, a method has been proposed in which solid resin is dissolved in a water-soluble organic solvent by, if need be, mixing and dispersing a pigment. This resin solution is emulsified in water by spraying, agitation or other means while extracting the organic solvent in the droplets of said resin solution into water. If need be, this is further followed by separation, washing with water or other treatments to obtain non-viscous resin powder (U.S. Pat. Nos. 3,737,401, 3,306,342, 2,379,237 and 2,722,528). (This method is hereinafter referred to as the "wet-type powdering method" for the sake of convenience). Emulsification and extraction in this method may be accomplished either in one step by using all of a predetermined amount of water at one time or in two steps by first performing emulsification with a suitable quantity of water and then extracting the solvent by adding the remaining amount of water. The latter facilitates control of particle size.

In case of practising this method on a relatively small scale, for example on a laboratory scale, a resin solution in a container is dropped, sprayed or poured directly or through a conduit into water in a different cylindrical container, said water being strongly agitated by a common type of agitator having a rotor blade or blades, thereby to emulsify said resin solution in water.

In this case, if water in the container is sufficient, substantially all or the greater part of the solvent in the resin solution is transferred into water to form a solid-state resin powder.

On the other hand, if the amount of water is adjusted to a smaller level, it is possible to obtain an emulsion where the droplets of the resin solution are emulsified in the saturated solution of the solvent (hereinafter referred to simply as "emulsion"). This emulsion is dropped, sprayed or poured into violently agitated water in another container, causing the residual solvent in the droplets of the resin solution to transfer to the water to thereby produce a solid resin powder.

However, in the production of resin powder on an industrial scale through this wet powdering method, it was substantially impossible to control particle size and obtain particles with a globular or almost globular form by mere dimensional enlargement of said cylindrical container equipped with an agitator. In other words, since this method employs a batch technique, there is no alternative but to enlarge the container capacity for mass production of the resin, and this inevitably leads to the following disadvantages:

(1) There is a wide difference in shearing force between the central portion of the container and its peripheral portions, so that the particle size distribution of the emulsified or suspended particles is broadened, resulting in resin particles of a non-uniform particle size.

(2) The surface tension is reduced as the solvent elutes the water in the container, causing excessive entrainment of foam by agitation.

If the agitator performance is raised in order to solve the problem of (1) above, the phenomenon of (2) is promoted. Further, the foam retarded the propagation of shearing force, and the emulsion droplets deposit on the foam to impare contact with water, causing said droplets to float up as scum on the liquid surface. This gives rise to the following problems:

(1) Transfer of the solvent into water is extremely retarded or inhibited.

(2) The emulsion droplets or resin particles recombine or unite and thus cause deformation or coarsening of particles.

(3) The amount of water required for solvent extraction becomes dozens of times the theoretical amount.

Therefore, the batch-type apparatuses were necessarily subject to certain limitations with regard to increases in scale and operative power.

A method is also known in which said resin solution (prepared by dissolving solid resin in a water-soluble organic solvent and, if need be, further mixing and dispersing a pigment therein) and water are sprayed separately in a spray chamber so as to capture the droplets of the resin solution in water droplets while extracting the water-soluble organic solvent in the resin solution into water to thereby continuously obtain powdered resin (Japanese Patent Pub. No. 42615/71 and Japanese Patent Laid-Open No. 123770/75). However, as this method makes use of a system in which the droplets of the resin solution once sprayed into the air are again captured, the droplets of the resin solution recombine in the air at a considerable rate to coarsen the particles, so that the obtained resin powder exhibits a large average particle size and a broadened particle size distribution.

SUMMARY OF THE INVENTION

The object of this invention is to solve or improve upon the above-mentioned problems encountered in the prior art and to provide a method of continuously producing synthetic resin powder which exhibits a small average particle size and uniform particle size.

More specifically, this invention relates to a method of producing a resin powder characterized in that a resin solution prepared by dissolving a solid resin in a water-miscible solvent is sprayed from a nozzle while simultaneously spraying water from another nozzle located close to the first nozzle so as to form fine emulsified droplets of said resin in water, causing at least a substantial portion of the water-miscible solvent in said emulsion to rapidly transfer into water to produce a suspension of powdered resin, and then filtering said suspension. It is also envisaged in this invention to provide an apparatus used for practising the said method of the invention.

DETAILED DESCRIPTION OF THE INVENTION

Briefly, the method of this invention comprises the following steps:

(a) dissolving a solid resin in a water-miscible solvent to prepare a uniform resin solution;

(b) injecting said resin solution from a nozzle into a water jet streams from another nozzle provided adjacent to the first-said nozzle, said injection of the resin solution being performed directly and simultaneously with the jetting of water, to thereby form fine emulsified droplets of said resin solution in water;

(c) properly adjusting the rates of injection of said resin solution and water from the respective nozzles so that at least a substantial portion of the water-miscible solvent in said emulsion droplets will rapidly transfer into water, thereby producing a suspension of the fine powdered resin;

(d) discharging the thus formed suspension of powdered resin onto a preferably continuously moving endless filter cloth conveyor while sucking and filtering off the liquid phase in the suspension from the backside of said filter cloth conveyor to thereby obtain moistened resin powder;

(e) spraying and washing with water said moist resin powder at the stage following said filtration in the course of movement of said filter cloth conveyor while sucking and filtering off washing water from the backside of said conveyor to form a water containing resin powder, and if need be, further heating said water-containing resin powder at the stage following said washing the course of movement of said filter cloth conveyor while sucking off moisture from the backside of the filter cloth conveyor so that the solid content will exceed 60 by weight %; and (f) recovering the resin powder from the filter cloth conveyor.

According to the method of this invention, the resin solution ejected from one nozzle is immediately contacted with water ejected from another adjacently positioned nozzle and is thereby emulsified with water, with the respective droplets of the emulsified resin solution being isolated from each other by water, the solvent in said droplets being rapidly extracted into water to form a non-viscous resin powder. Therefore, the obtained resin powder is fine and uniform in particle size. The suspension of this resin powder is sent into a commonly used type of filtering device such as a high-speed decanter or centrifugal separator to separate said mixed solution, or more preferably said suspension is successively subjected to filtration, washing and hydro-extraction or drying by means of a filter cloth conveyor, thereby to continuously obtain said resin powder with a small and uniform particle size.

The nozzle for ejecting said resin solution and water may be of any type so long as the respective nozzle holes are positioned adjacent to each other so that the resin solution from one nozzle will be directly injected into a jet of water from another nozzle. However, it is preferred to use a nozzle mechanism in which two integrated nozzles are independently provided, or a so-called "binary fluid nozzle" in which the nozzle openings are circular and concentric or adjacent to each other such that the directions of ejection from the respective nozzle holes will be parallel to or cross each other.

Such a binary fluid nozzle is known in the art, and it is generally used for air spray coating or for powdering or atomization in the spray drying of instant coffee, detergent, agricultural chemicals, etc., by ejecting air or steam and a fluid material simultaneously from the respective nozzles.

Figure 1:
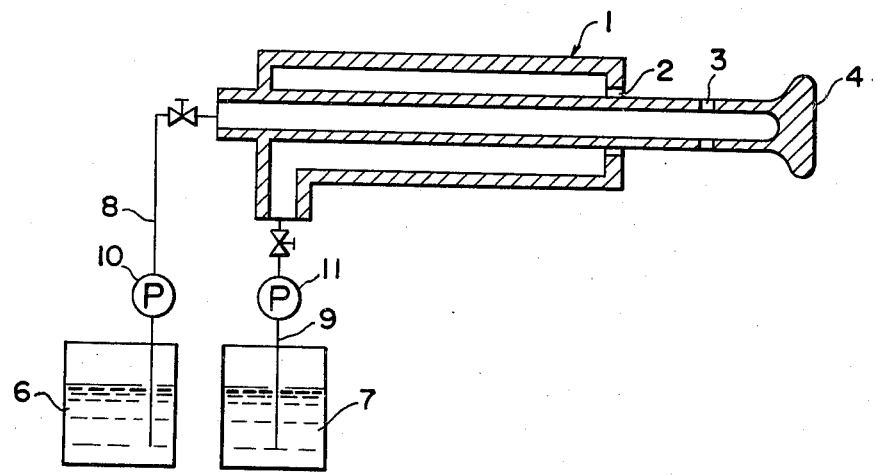
FIG. 1 is a section of binary fluid nozzle and associated feed means.
Figure 5:
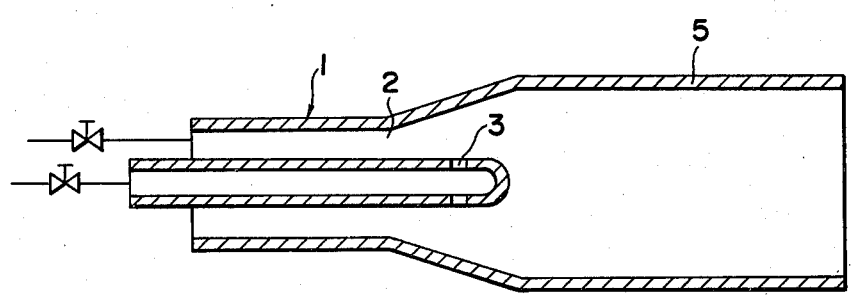
FIG. 5 is a section of another binary fluid nozzle embodiment.

In these drawings, the nozzle body is indicated by numeral 1 and the water and resin solution injecting or atomizing nozzles are shown by numerals 2 and 3, respectively. If an impingement plate such as shown in 4 in FIG. 1 is provided at an end of the nozzle body, the sprayed particles can be broken into even smaller size. Also, a conduit 5 may be connected to each nozzle as shown in FIG. 5, thereby to allow direct transport of the resin powder suspension into a centrifugal separator or high-speed decanter or onto an endless filter cloth conveyor as mentioned above.

Figure 7:
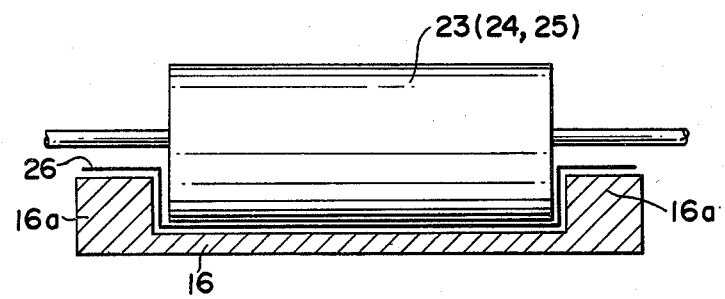
FIG. 7 is a section of a preferred construction of a belt portion.
Figure 6:
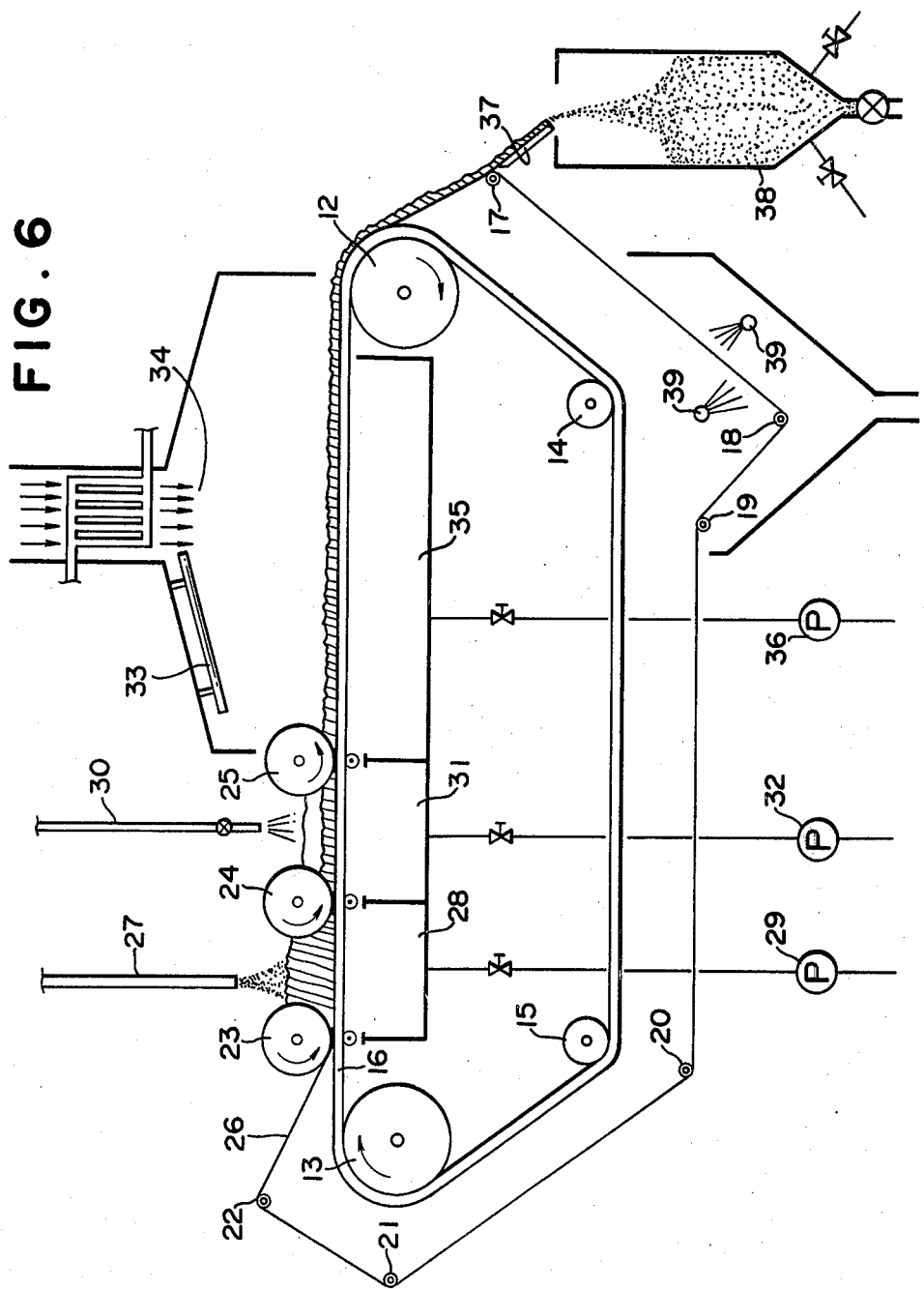
FIG. 6 is an endless filter cloth conveyor system.

FIG. 6 shows an example of an endless filter cloth conveyor system preferred for use in practising the method of this invention, and FIG. 7 shows, in section, an example of a preferred construction of the belt portion. In these drawings, numeral 12 indicates a driving roll, 16 a filter belt, 23, 24 and 25 press rolls, 26 a filter cloth belt, 28, 31 and 35 vacuum chamber, 34 a warm or hot air heating device, and 37 a scraper.

The method of this invention will now be described in further detail with reference to the accompanying drawings.

Referring to FIG. 1, it will be seen that the binary fluid nozzle assembly 1 is connected to a resin solution supply tank 6 and a water supply tank 7 through conduits 8 and 9, respectively. Said conduits 8 and 9 are provided halfway along their length with pumps 10 and 11 for feeding the resin solution and water, respectively, to the binary fluid nozzle assembly 1. If water supplied by the pump 11 is injected at a sufficiently high speed from the nozzle 2, the area in the neighborhood of the nozzle opening 3 is rendered into a reduced-pressure condition to suck the synthetic resin solution, so that the pump 10 may not be required. Also, in case the operation of the binary fluid nozzle assembly 1 is performed in a reduced-pressure or vacuum chamber, both pumps 10 and 11 may be excluded because, in such case, both water and synthetic resin solution are automatically sucked into the chamber. When the pumps 10 and 11 are not used as in the above-said cases, it is desirable to regulate the size and configuration of the conduits 8 and 9 as well as the respective nozzles so that the amounts of resin solution and water injected from the binary fluid nozzle assembly 1 will be in such a quantitative relation that the entire quantity of the solvent in said solution may be dissolved in water as further discussed later, or to provide a valve or cock for controlling the liquid flow rate in at least one of said conduits 8 and 9.

In such an arrangement, the binary fluid nozzle assembly 1 is operated to inject water and resin solution from the respective nozzles 2 and 3 into a suitable medium such as air, vacuum or water at a predetermined speed. In this case, if the water and resin solution injection rate is properly adjusted, water and resin solution mixed simultaneously at the time of injection form fine emulsified droplets while the water-miscible solvent in the resin solution instantaneously or rapidly transfers into and mixes with water to produce the nonviscous fine resin particles suspended in the water-solvent mixed solution.

The quantitative relation between resin solution and water is determined largely depending on the solubility in water of the water-miscible solvent used for preparing the resin solution, however, the relation is usually determined such that the amount of water supplied will be less than about 50 times by weight, preferably within the range of about 5 to 40 times by weight of the solvent contained in the resin solution. It is to be noted, however, that if the amount of water supplied is less than 5 times by weight of the contained solvent, powdering of the resin solution by the water spray pressure or prevention of recombination of the emulsified droplets through the medium of water becomes unsatisfactory, and the formed resin powder retains a slight viscosity which gives rise to coarsening or agglomeration of the resin particles. It should also be noted that even if the amount of water is made more than 40 times by weight of the solvent, no further improvement is provided in resin powdering, and the step of separating and recovering resin powder from the suspension of resin particles and the operation of recovering the solvent from the water-solvent mixture become harder to perform.

In connection with the quantitative relation, when a resin solution and water are sprayed into air or vacuum from the binary fluid nozzle assembly, "water" means only such water which is supplied into the binary fluid nozzle from the water tank 7. On the other hand, under the resin solution and water are sprayed into water, this last-said water is also included in the interpretation of water usage in this invention.

In order to establish such a quantitative relation between resin solution and water, it is required to properly select the size and configuration of the respective nozzles used as well as the outputs of the pumps 10 and 11. Particularly, it is highly desirable to keep the rate of injection of each fluid constant at all times in order to obtain resin powder with a uniform particle size. The pump recommended for meeting this requirement must be free of fluctuations and possess a uniform discharge rate. Examples are centrifugal, reciprocating or rotary pumps such as volute pumps, turbine pumps, propeller pumps, gear pumps, screw pumps, partition pumps, magnet pumps, lab pumps, diaphragm pumps, bellows pumps, high pressure constant delivery pumps and bunton pumps. The synthetic resin solution and water feed rate can be controlled by interlocking the pumps 10 and 11.

For instance, if arrangement is made such that power is transmitted to the pumps 10 and 11 from a single motor by means of gears, belts or chains, the output ratio of pumps 10 to 11 can be held constant even if the motor speed varies slightly. In this case, if power transmission capable of variation is adopted, the output ratio of pumps 10 to 11 can also be varied.

In this way, feed pressures for water and resin solution through the respective nozzles in the binary fluid nozzle assembly are maintained within a determined range while adjusting the quantitative relation and injection rate. Although they may vary depending on the shape and diameter of the nozzle used, concentration of solids in the resin solution and/or other factors, the water feed pressure is usually adjusted so as to fall within the range of 5 to 50 kg/cm$^2$ and the resin solution feed pressure within the range of 1 to 30 kg/cm$^2$, preferably 5 to 15 kg/cm$^2$. If the feed pressure of either of said fluids is lower than this range, no satisfactory atomization of the resin solution is attained. Even if said feed pressure is elevated to a value higher than this range, the produced resin particles are undesirably deformed into a bar-or thread- like shape in atomization without any further improvement. The particle size of the resin is also affected by the diameter and shape of the nozzles, the flow rate and temperature of the water and resin solution and the viscosity of the resin solution, so that it is desirable to properly adjust said conditions for obtaining resin particles which exhibit a uniform size.

In the present invention, when spraying water and resin solution from said binary fluid nozzle assembly in the air or in vacuum, it is advisable to introduce the binary fluid nozzle assembly into the spray chamber under normal atmospheric conditions or under a reduced-pressure or vacuum condition, and then properly withdraw the resin powder suspension accumulated at the bottom of the spray chamber.

When the spray operation is performed in water, the binary fluid nozzle assembly may be introduced into a pipe in which water flows at a predetermined flow rate, or the solution may be sprayed into a water tank in which supply and discharge of a predetermined amount of water are performed simultaneously and which may or may not be properly agitated.

The thus obtained resin powder in the suspension can be separated from the solvent by means of an ordinary filter or centrifugal separator. The filters usable for this purpose include, for example, cape filters, pressure filters, vacuum filters, high-speed decanters and centrifugal filters. The obtained resin powder may be dried alone or after repeating suitable water washing and separation to obtain a powdery product, or said resin powder may be dispersed in a dispersant mainly consisting of water to prepare a slurry-state coating material.

Also, the suspension containing the finely divided resin powder obtained by the said method may be discharged onto a continously moving endless filter cloth conveyor so that the liquid phase in the suspension is sucked and filtered out from the reverse side of said filter cloth conveyor to thereby obtain moist resin powder.

Said discharge of the suspension onto the endless filter cloth conveyor may be accomplished, for example, by injecting water and resin solution into a funnel-like container from the binary fluid nozzle assembly and dropping the formed suspension onto the filter cloth conveyor from an opening formed at the bottom of the container, or by causing the suspension, which was formed by water and resin solution sprayed from said nozzle assembly, to flow down onto the filter cloth conveyor directly or through a pipe after reservation in a tank.

From the mixture of water and solvent separated from the resin particles, the solvent may be further separated and recovered or concentrated by distillation or reverse osmosis for reuse.

Now the endless filter cloth conveyor used in this invention will be described with reference to FIG. 6 which shows an example of such endless filter cloth conveyor in detail.

The moving portion of the conveyor comprises a filter belt 16 passed around a driving roll 12, a take-up roll 13 and guide rolls 14, 15, and a filter cloth belt 26 arranged to move while overlying the said filter belt along the upper surface of the conveyor by means of filter cloth guide rolls 17, 18, 19, 20, 21, 22 and press rolls 23, 24, 25. The suspension of fine resin powder formed in the above-said method is supplied through a pipe 27 onto an area of the filter belt 26 defined between said press rolls 23 and 24. At the same time, the liquid phase in said suspension is sucked and separated to the reverse of said filter belt 16 by the suction produced in a reduced-pressure chamber 28 disposed on the reverse side (underside) of said filter cloth belt 26 and filter belt 16. The inside of said chamber 28 is maintained in a reduced-pressure condition by a vacuum pump 29. Then the moist resin powder is carried to the area between press rolls 24 and 25 by the movement of the filter cloth belt 26 where it is washed with water sprayed from a pipe 30. During this operation, the liquid phase is sucked and separated in the same way as mentioned above by means of a reduced-pressure chamber 1 and a vacuum pump 32.

The water-containing resin powder which has undergone water washing and hydroextraction is further carried with movement of the filter cloth belt 26 to an area where it is exposed to light from an infrared lamp 33 and warm or hot air from a heating device 34 and is thereby heated and dried. Moisture suction the same as mentioned above, is also effected by a reduced-pressure chamber 35 and a vacuum pump 36 during this operation. The dried resin powder is scraped off from the filter cloth belt 26 by a scraper 37 and falls into a fluidized drying chamber 38. The filter cloth belt 26 further advances to a belt washing section where said belt is washed with water sprayed from nozzle 39 to prevent clogging of the belt meshes.

When it is desired to use said resin powder as a slurry paint as discussed hereinafter, the water-containing resin powder after said water washing is not dried and immediately scraped off from the filter cloth belt 26 and recovered.

Said filter coth conveyor belt may be made from a known filter fabric which is capable of filtering out the particles with sizes of about 1 to 500 $\mu$. For instance, such filter cloth may be made by plain weaving, twill weaving, broken twill weaving or ducklike weaving of synthetic fibers such as nylon, polyethylene, polyvinyl chloride, etc., or natural fibers such as cotton, wool, camel hair, horse hair, silk, etc. The filter belt 16, as shown in FIG. 7, has a sectional shape which is raised up at both ends 16a. Thus, the filter cloth belt 26, when placed in the area between the press rolls 23–25, are pressed against the filter belt 16 by said press rolls 23–25 so that both ends thereof are raised up after the fashion of said filter belt 16, thereby preventing the resin powder suspension and washing water supplied in between said press rolls 23 and 24 and between rolls 24 and 25 from flowing out from either belt end.

Said filter belt 16 is made by laminating rubber on a stainless base. Both stainless base and rubber lamination are formed with pores or slits for sucking the liquid and/or gaseous material by the suction in each reduced-pressure chamber.

In the step of separating the liquid phase from the suspension, it is desirable to suck and separate the liquid phase to such an extent that the solid content in the suspension will fall within the range of about 40 to 70 by weight %. If such solid content is less than 40 by weight %, a large quantity of water is required for the ensuing washing of resin powder. Solid content of over 70 by weight % is also undesirable for the reason of limited filtering performance.

The amount of water used for washing of moist resin powder after filtration of the liquid phase is preferably about 1 to 10 times by weight the solid content of resin powder. If such amount of washing water is less than 1 time the solid content, no sufficient washing of resin powder can be attained, while if said water amount is greater than 10 times the solid content, no appreciable improvement is provided in washing effect, and rather it invites inconveniences in practical operation such as necessitating dimensional enlargement and increase of power scale of the apparatus used for filtration of washing water.

The washing water used here may be of room temperature, but for reducing the drying time in the ensuing resin powder drying step, it is advisable to use warm water which is not so high in temperature as will cause softening and fusion or curing reaction of the resin powder.

In the present invention, it is desirable to adjust the feed of the resin powder suspension onto the filter cloth belt 26 such that the build-up of the post-washing water-containing resin powder on said belt 26 will be about 2 to 20 mm. If said water-containing resin powder build-up is greater than 20 mm, it is hard to attain sufficient drying of said resin powder by exposure to an infrared lamp or by warm or hot air, and if it is attempted to effect drying satisfactorily deep into the inside of the resin powder layer, the surface portion of such resin layer is heated excessively to cause fusion and coarsening of the resin particles. In the case of thermosetting resin, there may take place a curing reaction. On the other hand, if said resin powder build-up is made less than 2 mm, no appreciable facilitation of drying is provided and it instead tends to reduces productivity.

The temperature of warm or hot air used for the said purpose in this invention is preferably within the range of about 20° to 100° C., while the rate of application of said warm or hot air per unit area of the filter cloth belt is preferably within the range of about 2 to 10 m³/m².min. If said rate is less than 2 m³/m².min, no satisfactory drying can be attained, while if said rate is greater than 10 m³/m².min, the load required for exhaustion of the reduced-pressure chamber 35 is excessively increased. In the said steps of filtration, washing and drying of resin powder, each of the reduced-pressure chambers 28, 31 and 35 for sucking the liquid phase and/or gaseous body included therein is preferably maintained at a pressure about 200 to 500 mmHg lower than the atmospheric pressure.

If the difference between pressure in each said reduced-pressure chamber and atmospheric pressure is less than 200 mmHg, filtration of said liquid phase or drying may become insufficient, while said difference in excess of 500 mmHg results in an increased load for exhaustion.

In case the resin powder obtained in the above-said method is dispersed in a dispersant mainly consisting of water for use as slurry coating, it is possible to dispense with at least one of the following means: heating by the infrared lamp 33 and warm or hot air heating device 34, suction by the reduced-pressure chamber 35 and vacuum pump 36, and use of the fluid drying chamber 38.

Also, the mixture of water and solvent separated from the resin particles may be subjected to distillation or reverse osmosis to separate and recover or concentrate the solvent in the mixture for reuse thereof.

The solid resin used as base resin in this invention is of a water-insoluble type such as phenol resin, amino resin, epoxy resin, acrylic resin, polyester resin, polyurethane resin, vinyl chloride resin, etc.

However, in case of using the obtained resin powder as a slurry coating material, it is desirable to employ a solid resin having a softening point of about 5° to 150° C.

The term "slurry coating material", or "slurry paint" used herein refers to a coating material or paint obtained by dispersing said resin powder having a particle size of about 1.0 to 80μ in the medium (mostly water) such that the solids concentration will be about 10 to 70 by weight %.

If a powdered resin having a softening point of lower than 5° C. is used, the resin particles will agglomerate and become susceptable to precipitation during storage of the coating material. Also, use of powdered resin having a softening point of higher than 150° C. proves unable to provide satisfactory fluidity and smoothness during heating and drying of the coating film. Thus, it is preferred to use a powdered resin having a softening point of from about 30° to 110° C. In case of using the obtained powdered resin for powder coating, it is recommended to use a resin having a softening point of from about 30° to 120° C. Use of a resin having a softening point lower than 30° C. involves the possibility of causing blocking during storage of the powder coating material, while use of a resin having a softening point higher than 120° C. results in poor smoothness of the coating film. It is most preferred to use a resin having a softening point within the range of about 60° to 110° C.

The "water-miscible solvent" used in this invention means a solvent whose solubility in water is higher than 3 weight % (weight % of the solvent in the mixture of water and solvent at 20° C.), and examples of such solvent usable in this invention include: ketones such as methyl ethyl ketone, methyl propyl ketone, diethyl ketone, methyl isobutyl ketone and cyclohexane; ethers such as ethyl ether and ethylene glycol diethyl ether; esters such as methyl formate, ethyl formate, methyl acetate, ethyl acetate, ethylene glycol monoethyl ether acetate and glycol diacetate; ether alcohols such as ethylene glycol monophenyl ether; alcohols such as n-butyl alcohol, sec-butyl alcohol, isobutyl alcohol, cyclohexanol and benzyl alcohol; chlorine-substituted hydrocarbons such as $\beta,\beta'$-dichlorodiethyl ether and methylene chloride, nitro compounds such as nitromethane and nitroethane; aniline, and the like, and these solvents may be used either singly or in combination.

Solvents having water solubility of greater than 10 by weight % are preferred as they can be extracted with a small quantity of water. Most preferred of these solvents are those whose boiling points are lower than 100° C. because they are capable of producing a water-solvent azeotropic mixture with high solvent concentration in recovering the solvent by distilling the water-solvent mixture after separation of the produced resin powder, and such azeotropic mixture can be immediately reused as solvent for dissolving the solid resin.

The resin solution is prepared by dissolving said solid resin in said water-miscible solvent uniformly at a suitable concentration.

If desired, suitable additives such as plasticizer, colored pigment, extender, dye, curing agent, fluidity regulator and stabilizer may be added in suitable quantities in said resin solution.

The pigment loading in the solution may be suitably adjusted depending on the type of the pigment used and the degree of pigmentation. When using the resin solution as paint, it is desirable to load the pigment in an amount of less than 70 weight % in the particles for the reason of hot-melt fluidity of the resin particles. The pigment produced as sediment in water in the pigment preparation step or the water-containing pigment cake obtained by filtering such sediment can be also used. As the pigment in such water-containing cake exists in the form of primary particles and is easily dispersable in said resin solution, such pigment is particularly suited for use in this invention. Dispersion of such pigment in the resin solution can be easily effectuated by using a known type of kneading or mixing machine such as for example a disperser, roll mill, sand mill, band mill, Sasmeiyer mill or Centry mill. It is desirable that said resin solution have a solid concentration of 20 to 75 weight %. If the solid concentration is less than 20 weight %, a voluminous amount of water is required for extraction of the solvent, resulting in a reduced yield of resin powder. On the other hand, if said solids concentration exceeds 75 weight %, the solution viscosity is increased to make it hard to accomplish desired atomization of the resin solution by spraying, and the obtained resin particles are coarsened. Also, the resin solution feed pressure required for spray is elevated.

The resin powder obtained according to the above-described method of this invention can be used for a wide variety of purposes such as mentioned above, but it finds best application for powder or slurry coating. For obtaining a slurry coating material, there is first prepared resin powder with particle size of about 1 to about $80\mu$, preferably 5 to $30\mu$, according to the method of this invention. If resin powder with particle size of greater than $80\mu$ is used, the obtained coating material proves to be poor in keeping quality, spray coating workability and smoothness of coating film, while if particle size is smaller than $1\mu$, the viscosity of the produced slurry coating material proves to be extremely low with the ordinary level of concentration, so that when coating is made by using such coating material to a normal thickness, usually between 20 and $80\mu$, sag and other defects are produced in the coating film.

Said resin powder is obtained as a suspension in the water-solvent mixed solution, so that the former is separated from said mixed solution, followed, if desired, by one to three times of washing with water and separation, to obtain water-containing resin powder with a solid content of about 30 to 80 weight %. This resin powder is further added with pertinent quantities of water, surface active agent and/or other necessary additives and mixed homogeneously under agitation to obtain a slurry coating material with solid content of from about 10 to 70 weight %. If the solid content is less than 10 weight %, the slurry viscosity is extremely lowered to increase the risk of causing sagging during coating operation. It is also impossible to perform thick coating at one time, and a long time is required for drying of the coating film. The solid content of over 70 weight % leads to extremely high slurry viscosity, which makes preparation of the coating material and its coating operation very difficult. Thus, the preferred range of solid concentration in the slurry coating material is from about 30 to 60 weight %. The surface active agent may be added in an amount of up to 0.5 weight parts for 100 weight parts of the resin powder (solid content) so as not to affect water-resistance of the coating film. It is also possible to add a thickener, water-soluble resin, emulsion resin and the like for the purpose of improving storage stability of the coating material or preventing development of cracks in the coating film. These additives may be added in an amount of up to 10 weight parts (by solids content) for 100 weight parts of resin powder so as not to lower water-resistance or chemical resistance of the coating film or to avoid the formation of blisters, bubblings, pinholes or other defects as a result of skinning during storage of the coating material or by surface drying during heat drying of the coating film.

The thus obtained slurry coating material is composed of the resin particles which are substantially spherical in shape and uniform in particle size, so that such coating material is small in particle surface area and hence excellent in dispersion stability even if the surface active agent required for such dispersion stability in water is added only in a small amount. Such coating material also has good fluidity and shows excellent atomizability in spray coating, inhibiting entrainment of air into the sprayed droplets. Therefore, the obtained coating film possesses high water and chemical resistance and excellent surface smoothness.

For obtaining a powder coating material, there is prepared resin powder having a particle, size of 10 to $80\mu$ according to the method of this invention. It is recommended to use resin powder having a particle size of about 15 to $30\mu$ for performing thin-film coating and that having a particle size of about 30 to $60\mu$ for coating to a normal film thickness. Use of resin powder having a particle size greater than $80\mu$ results in poor surface smoothness of the coating film, while use of resin powder having a particle size less than $10\mu$ results in excessively worsened adhesion to the article coated. When using the resin powder of this invention for powder coating, the water content must be kept to less than 2 weight %. The water content can be adjusted by drying on said filter cloth belt and, if desired, further performing fluid drying for 2 to 10 hours. If the water content is greater than 2 weight %, the powder coating material may suffer from blocking during storage, and also bubblings, cissings and pinholes are liable to be created in the course of film-forming under heating after coating.

The present inventors have also developed a binary fluid nozzle system which can be most advantageously employed in practising the method of this invention. This binary fluid nozzle system has a completely novel construction making possible adjustment of each nozzle diameter, so as to allow adjustment of the particle size and shape irrespective of the throughput of the fluid. This nozzle will be discussed hereinbelow. (For the convenience of discussion, the solvent used for dissolving solids to prepare solution is referred to as solvent I and the solvent which does not dissolve said solids but dissolves said solvent I is referred to as solvent II).

Figure 8:
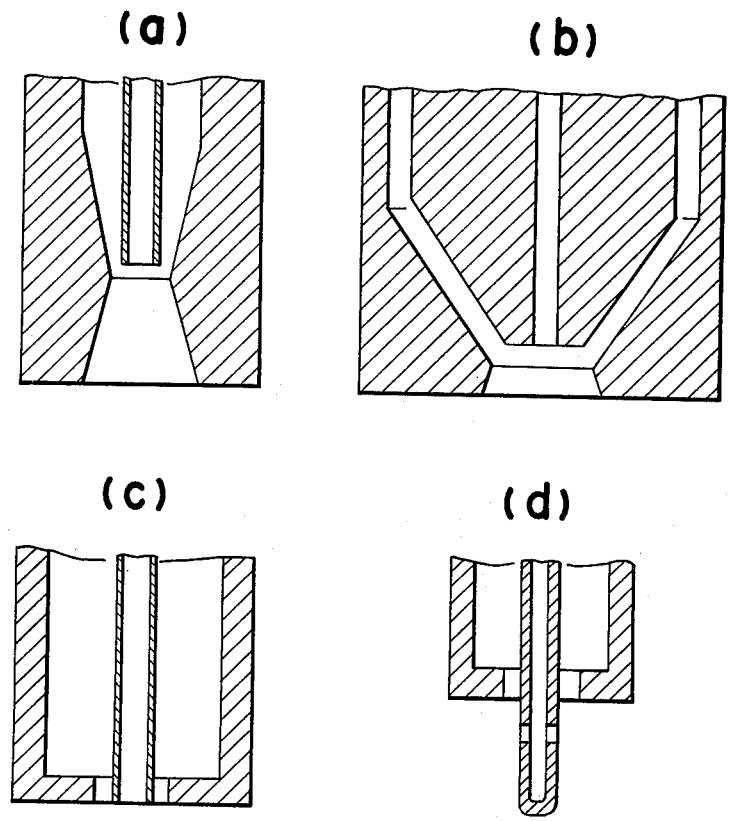
FIGS 8 (a) (b) (c) (d) are sections of several types of binary fluid nozzle embodiments.

There are known several types of binary fluid nozzle devices such as the internally mixing type shown as (a) in FIG. 8, slant type (b), parallel type (c) and orthogonal type (d). However, in all of these known types of nozzle devices, the nozzle diameter is fixed and hence if fluid feed pressure is increased, flow velocity is also elevated while the sprayed particle size is reduced.

Therefore, for obtaining a resin powder of a predetermined particle size range, the particles must be produced at a given throughput by keeping feed pressure constant. Further, when the powdering operation is stopped, it is hard to stop feed of both solution and solvent II at exactly the same moment, and one of them could be drawn into the nozzle tip of the other fluid and solidified there to cause nozzle clogging.

The air spray gun used for application of the coating material has an end-pointed valve for adjusting the nozzle opening through which to discharge the coating material, but the air injection nozzle is fixed in diameter and hence adjustment of its diameter is impossible. When the coating material is sprayed by said spray gun, the air flow rate is adjusted by a separately provided valve and the air injection rate is determined in accordance with the discharge of coating material to regulate atomization of the coating material within the proper range. In use of the binary fluid nozzle device of such construction for wet powdering, if the injection rate of solvent II is adjusted to keep the degree of atomization constant when changing the discharge of solution, the ratio between the amount of solution and solvent II varies thereby changing the shape of the produced powder particles. Although the shape of the powder particles varies according to the extraction rate of solvent I from said emulsified droplets, said extraction rate is determined according to the relative quantity of solvent II.

On the other hand, if the ratio between the amount of solution and solvent II is made constant for keeping the particle shape constant, it becomes impossible to maintain the degree of atomization constant.

The present inventors have developed a binary fluid nozzle device which is free of said defects of the prior art and which allows separate adjustment of the openings and diameters of the respective nozzles at the nozzle end. The binary fluid nozzle device provided according to this invention comprises an outer nozzle cylinder and an inner nozzle cylinder arranged coaxially with each other, wherein the internal opening surface of the outer nozzle cylinder and the corresponding external end surface of the inner nozzle cylinder present conical faces so as to be tightly engageable with each other, and said inner nozzle cylinder is supported by a support so as to be movable axially of the nozzle device, said device also including a valve body adapted to close the end opening of the inner nozzle cylinder and arranged to form a variable space by movement thereof, said valve body being supported by another support so as to be movable axially through a shaft provided integral with said valve body. Use of this binary fluid nozzle device allows change of the discharge of said solution irrespective of feed pressure and injection rate, and therefore the discharge of solvent II may be changed while adjusting its injection rate in proportion to change of the discharge of said solution, thus allowing production of powdered resin with desired size and shape.

Further, when stopping powdering, it is possible to close both of the nozzles, thus eliminating any risk of nozzle clogging.

Now the invention will be described with reference to the accompanying drawings.

Referring to FIG. 9, numeral 1 indicates an outer nozzle cylinder and 2 an inner nozzle cylinder. It will be noted that the internal surface 1' at the opening of said outer cylinder and the corresponding external surface 2' at the end of said inner cylinder present conical side faces which engage with each other. Said inner nozzle cylinder 2 is supported by a support 3 provided integral with the outer nozzle cylinder so as to allow axial movement of said inner nozzle cylinder to the position where said conical side faces 1' and 2' are aligned with each other relative to the axis of the cone. Such support may be conveniently effected by thread engagement. That is, as shown in the drawing, mutually engaging threads are provided on the external surface of the inner nozzle cylinder 2 and on the corresponding internal surface of the hole of the support 3 through which said inner cylinder 2 is to be passed, and then the inner nozzle cylinder 2 is screwed into said hole in the support 3. A valve body 4 is provided at the end opening of said inner nozzle cylinder 2, said valve body 4 being supported by a support 6 integral with the inner nozzle cylinder 2 through a shaft 5 extending from the valve body so that said valve body 4 is movable axially. Such supporting may be also effected by thread engagement as in the above-said case. It is essential that said valve body 4 and the end opening of said inner nozzle cylinder 2 have mutually tightly engaging faces so that the end opening of the inner nozzle cylinder 2 may be perfectly closed when said valve body and inner nozzle cylinder are brought into contact with each other by moving the shaft 5. For effecting such tight engagement, the internal surface **2*a* of the end opening of the inner nozzle cylinder and the corresponding side surface 4*a* of the valve body may be formed into the mutually fitting conical faces as shown in FIG. 9**(*a*), or the opening end face **2*b* of the inner nozzle cylinder and the bottom surface 4*b* of the valve body may be formed flat so that they fit squarely with each other as shown in FIG. 9**(*b*). In the former case (*a*), the shaft 5 must coincide with the axis of said cone, and in the latter case (*b*), said shaft 5 must be vertical to said flat fitting faces.

In the binary fluid nozzle of the above-described construction, there is provided a clearance 7 defined by the internal surface 1' of the opening of the outer nozzle cylinder and the external surface **2*c* at the end of the inner nozzle cylinder. Such clearance 7** may be adjusted in opening width or may be eliminated by moving the inner nozzle cylinder in said coaxial direction.

Also, the clearance 8 defined by the internal surface **2*a* of the end opening of the inner nozzle cylinder and the corresponding side face 4*a* of the valve body, or by the opening end face 2*b* of the inner nozzle cylinder and the bottom surface 4*b* of the valve body, may be adjusted in width or eliminated by moving the valve body 4 axially of the shaft 5**.

In the binary fluid nozzle device of this invention, fluids are injected from these clearance 7 and 8, and hence the discharge and injection rate can be adjusted independently of each other by adjusting the width of said respective clearances and fluid feed pressure. This allows variation of the throughput while maintaining the powder particle size and shape constant, or variation of particle size without changing particle shape.

It is also possible to prevent back-flow of the fluids and nozzle clogging by closing said clearances 7 and 8.

When the device of this invention is adapted to a continuous powder suspension producing method in which, as shown in FIG. 10, the binary fluid nozzle device of this invention is fixed close to the bottom of a tank and the suspension containing the powder formed by a wet powdering method is retained in the tank for a while and then withdrawn from the top of the tank, it is possible to prevent the suspension from flowing back into the nozzle when powdering is stopped.

The binary fluid nozzle device of this invention may be provided in various sizes. In a preferred example, the device may be designed such that when said clearances 7 and 8 are adjusted in width to approximately 0.1 to 2 mm and approximately 0.05 to 1 mm, respectively, the areas of the outer end faces of said clearances will become approximately 0.05 to 2.5 cm$^2$ and approximately 0.01 to 0.5 cm$^2$, respectively.

The invention will now be described in further detail by way of embodiments thereof. All "parts" and "%" in the following descriptions of the embodiments are by weight.

Before practising the embodiments of this invention, there were prepared the following resin solutions A to C.

Resin Solution A

A solid acrylic resin ("SAG-1" by Sumitomo Kagaku Kogyo (Chemical Industry) Co., Ltd., softening point: approx. 100° C.) was dissolved in the azeotropic fraction (methyl ethyl ketone (MEK) content: 88.7%) of MEK (water solubility at 20° C. being 22.6%) and water to prepare a 30% resin solution, and to 1,700 parts of this solution were added 957 parts of water-containing iron oxide pigment cake ("Bengara Tenyo #502" by Tone Sangyo (Industry) Co., Ltd., water content: 8.95%), 150 parts of sebacic acid (curing agent) and 30 parts of a nonionic surface active agent, and the mixture was kneaded by a small-sized attritor operated at speed of 150 r.p.m. for 60 minutes to obtain a mill base with pigment dispersion degree of less than 5μ (measured by a grindometer).

2,800 Parts of the above-said 30% resin solution was added to 2,000 parts of said mill base to adjust its viscosity, thereby preparing the resin solution A.

Resin Solution B

A saturated polyethylene terephthalate resin having a softening point of 60° C. was dissolved in the azeotropic fraction (tetrahydrofuran (THF) content: 95.7%) of THF (water solubility at 20° C. being 100%) and water to prepare a 44.1% resin solution, and 223 parts of phthalocyanine blue was added to 1,190 parts of said resin solution, with the mixture being kneaded by a small-sized attritor at speed of 150 r.p.m. for 180 minutes to obtain a mill base with pigment dispersion degree of less than 5μ.

900 Parts of said 44.1% polyethylene terephthalate resin solution was added to 1,000 parts of said mill base to adjust its viscosity, thereby preparing the resin solution B.

Resin Solution C

An epoxy resin ("Epikote #1004" by Shell Inc., softening point: 96°-104° C.) was dissolved in MEK to prepare a 36.3% solution, and to 75.4 parts of this solution were added 20 parts of titanium oxide and 4.6 parts of dicyandiamide (curing agent), with the mixture being kneaded by a ball mill for 12 hours to obtain the resin solution C with pigment dispersion degree of less than 10μ.

EXAMPLE 1

Figure 2:
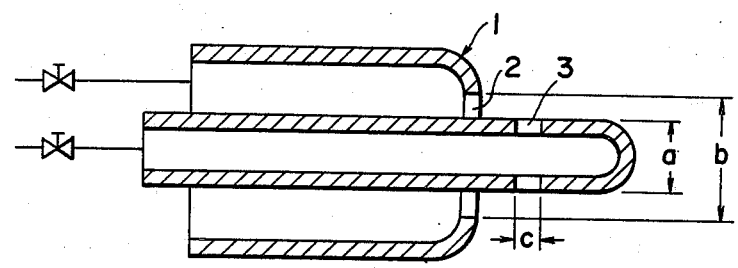
FIG. 2 is a section of another binary fluid nozzle embodiment.

A binary fluid nozzle device having the construction shown in FIG. 2, with a measuring 10.0 mm φ, b measuring 10.25 mm φ and c measuring 2 mm φ, was set at an upper part in a tank equipped with a rotor blade type agitator with diameter of 50 cm and depth of 100 cm, with the injection openings of said nozzle device being directed inwardly of the tank. The water injection nozzle 2 and the resin solution injection nozzle (with 3 openings) were connected to the water tank and resin solution tank, respectively, through a conduit adapted with a gear pump and a valve as shown in FIG. 1, and water was injected from the nozzle 2 at the rate of 25 kg/min, with water temperature and pressure being adjusted to 19° C. and 20 kg/cm$^2$, respectively, while said resin solution A was simultaneously injected at the rate of 3 kg/min, with solution temperature and feed pressure being adjusted to 23° C. and 4 kg/cm$^2$, respectively, thereby obtaining a resin powder suspension.

Resin powder was separated from this suspension by a centrifugal separator, followed by repeated washing with equal amount of water and separation, consequently obtaining a water-containing resin powder with solids content of 65 weight %. Measurements of particle size distribution and average particle size of this water-containing resin powder (measured by Coulter Counter Model-TA by Coulter Electronics Inc., this counter being used for determination of particle size distribution and average particle size in the suceeding examples) showed that 80% of the particles has particle size of 5 to 20μ, and the average particle size was 15μ. Also, a microscopic examination of this resin powder showed that the particles had no edges and were substantially globular in shape.

EXAMPLE 2

A resin powder suspension obtained in the same way as Example 1 was supplied not into a centrifugal separator but onto an endless filter cloth conveyor having the construction shown in FIG. 6 through a pipe 27 connected to the suspension tank. The width of the filter cloth belt 26 used in this conveyor was 60 cm and the distance from the driving roll 12 to the press roll 23 was 3 m. The moving speed of the filter cloth belt 26 was adjusted to 1.6 m/min.

Said resin powder suspension was passed down onto the filter cloth belt 26 from said pipe 27 at the rate of 28 kg/min, and the pressure in the reduced-pressure chamber 28 was adjusted such that the difference between pressure in said chamber and atmospheric pressure (such difference being hereinafter referred to simply as pressure difference) would be −350 mmHg and thereby the liquid phase in said suspension was filtered out.

The solid content of the resin powder which passed the press roll 24 after filtration was 45%. Then washing water (19° C.) of an amount 5 times by weight the solid content of said resin powder was sprayed from the pipe 30 to wash the resin powder while the reduced-pressure chamber 31 was adjusted to a pressure difference of −450 mmHg to filter out the liquid phase. The solid content of the resin powder which passed the press roll 25 after washing was 64%, and the build-up of resin powder on the filter cloth belt 26 was approximately 5 mm. This water-containing resin powder, without being dried, was scraped off from the filter cloth belt by a scraper 37 to obtain water-containing resin powder A with a solid content of 64%.

The water-containing resin powder which had undergone washing was also subjected to heating on the filter cloth belt 26 by exposure to an infrared lamp 33 and by blowing of 40° C. hot air given at the rate of 6 m$^3$/m$^2$.min per unit area of said filter cloth belt 26, as well as drying by the reduced-pressure chamber 35 adjusted to pressure difference of −400 mmHg, and the thus treated resin powder was then scraped off from the filter cloth belt 26 by the scraper 37 to obtain powdered resin with a solid content of 82%. This powdered resin was further dried in a 30° C. fluid drying chamber 38 for 2 hours to obtain powdered resin A′ with a water content of 0.2%.

In both of said water-containing resin powder A and resin powder A′, 95% of the particles were 15 to 25μ in size and average particle size was 18μ. Also, a microscopic examination showed that the particles were non-angular and substantially globular in shape.

EXAMPLE 3

Figure 3:
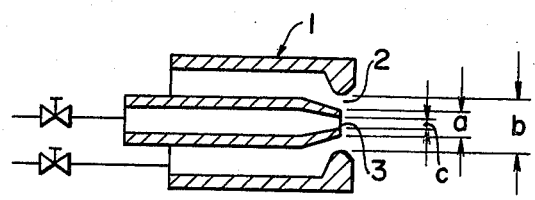
FIG. 3 is a section of another binary fluid nozzle embodiment.

A binary fluid nozzle device having the construction shown in FIG. 3, with a measuring 4 mm$\phi$, b measuring 6 mm$\phi$ and measuring 2 mm$\phi$, was set close to the center axis of a pipe with an inner diameter of 6 cm, and the water injection nozzle 2 and resin solution injection nozzle 3 were connected to the water tank and resin solution tank, respectively, through a conduit provided with a gear pump and a valve as in the case of Example 1. Water of 19° C. was supplied into said pipe at the flow rate of 4 kg/min in the same direction as the direction of injection of said nozzle device, and water was injected from the nozzle 2 at the rate of 25 kg/min, with water temperature and pressure being adjusted to 19° C. and 18 kg/cm$^2$, respectively, while the said resin solution B, 22° C. in temperature and 3 kg/cm$^2$ in feed pressure, was simultaneously injected at the rate of 3 kg/min to obtain a resin powder suspension.

Resin powder was separated from this suspension by a high speed decanter, and then subjected to repeated washing with equal amount of water and to separation, whereby there was consequently obtained a water-containing resin powder with a solution content of 68 weight %.

This resin powder contained 70% of particles with particle size of 16 to 28μ, and the average particle size was 22μ. It was also ascertained by microscopic examination that the particles had no edges and were almost globular in shape.

EXAMPLE 4

A resin powder suspension obtained in the same way as Example 3 was supplied not into a high-speed decanter but onto an endless filter cloth conveyor same of construction as that used in Example 2, with the moving speed of the filter cloth belt 26 being adjusted to 1.2 m/min. This resin powder suspension was then filtered and washed after the manner of Example 2 under the conditions shown in the following table to obtain water-containing resin powder B with a solid content of 55%, and this was further dried to obtain resin powder B′ with a water content of 0.1%. In both of these resin powder preparations, 80% of the particles ranged in size from 20 to 35μ, and the average particle size was 25μ.

| (a) | Feed of resin powder suspension onto the endless filter cloth conveyor | 32 kg/min |
|---|---|---|
| (b) | Pressure difference in reduced-pressure chamber 28 | −350 mmHg |
| (c) | Solid content of resin powder after filtration | 48% |
| (d) | Weight ratio of washing to resin powder (solid content) | 5 times as much |
| (e) | Washing water temperature | 19° C. |
| (f) | Pressure difference in reduced-pressure chamber 31 | −450 mmHg |
| (g) | Solid content of resin powder after filtration | 55% |
| (h) | Build-up resin powder on filter cloth belt after washing | approx. 7 mm |
| (i) | Hot air flow rate | 5 m$^3$/mm$^2$ . min |
| (j) | Hot air temperature | 50° C. |
| (k) | Pressure difference in reduced-pressure chamber 35 | −400 mmHg |
| (l) | Solid content of resin powder scraped off from filter cloth belt after drying | 86% |
| (m) | Fluidized drying chamber temperature | 35° C. |
| (n) | fluidized drying time | 2 hours |

EXAMPLE 5

Figure 4:
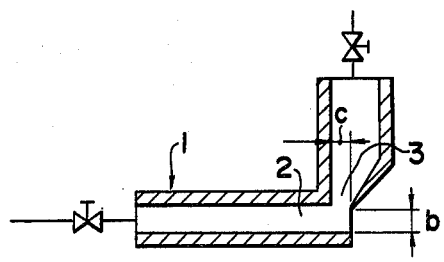
FIG. 4 is a section of another binary fluid nozzle embodiment.

By using the same apparatus as Example 1 except for use of a binary fluid nozzle device having the construction shown in FIG. 4 and measuring 1.5 mm$\phi$ in b and 1.5 mm$\phi$ in c, water was injected from the water injection nozzle at the rate of 12.5 kg/min, with water temperature and pressure being controlled to 19° C. and 16 kg/cm$^2$, while said resin solution C was simultaneously injected from the resin solution injection nozzle 3 at the rate of 3 kg/cm$^2$, to thereby obtain a resin powder suspension.

Resin powder was separated from this suspension by a centrifugal separator and further subjected to repeated washing with equal amount of water and to separation, to thereby obtain a water-containing resin powder with a solid content of 72 weight %. This resin powder contained 70% of particles ranging in size from 25 to 35μ, and the average particle size was 30μ.

A microscopic examination showed that the particles were free of edges and substantially globular in shape.

EXAMPLE 6

A resin powder suspension obtained in a similar way to Example 5 was filtered and washed after the manner of Example 2 under the conditions shown in the following table ((a) to (n) in the following table correspond to those in the table of Example 4), with the moving speed of the filter cloth belt 26 being adjusted to 1.8 m/min, thereby obtaining a water-containing resin powder C with solid content of 58%, and this was further dried to obtain resin powder C′ with a water content of 0.1% In both of these powdered resin products, 70% of the particles were 25 to 35μ in size and the average particle size was 30μ.

| (a) | 15.5 kg/min |
|---|---|
| (b) | −350 mmHg |
| (c) | 52% |
| (d) | 4 times as much |
| (e) | 19° C. |
| (f) | −350 mmHg |
| (g) | 58% |
| (h) | approx. 5 mm |
| (i) | 6 m$^3$/m$^2$ . min |
| (j) | 40° C. |
| (k) | −350 mmHg |
| (l) | 89% |
| (m) | 30° C. |

| (n) | 2 hours |
|---|---|

COMPARATIVE EXAMPLE 1

There was used a powdered apparatus of a known construction comprising an annular pipe disposed close to the ceiling of a 150×150×250 cm spray chamber for uniformly showering water into said chamber and also having a plurality of apertures for allowing water to flow down along the side wall of said chamber, a 0.5 mm-diameter injection nozzle provided centrally of the side wall of said chamber for injecting a resin solution into said chamber, said annular pipe and injection nozzle both being connected to a water tank and a resin solution tank, respectively, through a conduit provided with a gear pump and a valve, and a discharge pipe for discharing out the resin powder suspension from the bottom of said spray chamber. Water (19° C.) was sprayed from said annular pipe at the rate of 50 kg/min while said resin solution A (22° C., feed pressure 100 kg/cm$^2$) simultaneously injected from the injection nozzle at the rate of 1 kg/min, and the produced resin powder suspension was discharged out of the spray chamber from its bottom. This suspension was separated from the water-MEKmixed solution by a centrifugal separator and further subjected to repeated water washing (with equal amount of water) and separation to obtain water-containing resin powder D with a solid content of 55 weight %. This water-containing resin powder was further subjected to vacuum drying in a container at 30° C. and a pressure difference of −720 mmHg for 8 hours to obtain resin powder D' with a water content of 0.2%.

This resin powder contained 70% of particles having size of 30 to 60μ, and the average particle size was 42μ. A microscopic examination showed that course particles with elongated shape were contained in a fairly high proportion in the resin powder.

COMPARATIVE EXAMPLE 2

A cylindrical tank equipped with a rotor blade type agitator with inner diameter of 120 cm and height of 120 cm was supplied with water to the level of 60 cm, and while agitating the water by rotating said agitator at speed of 2,000 r.p.m., said resin solution B supplied under feed pressure of 250 kg/cm$^2$ was injected from a 0.5 mm-diameter resin solution injection nozzle provided in the tank close to its bottom at the rate of 2.5 kg/min for 5 minutes, and after continuing agitation for an additional 5 minutes, resin powder was separated from the produced suspension of resin particles by a high speed decanter. This was followed by repeated washing with equal amount of water and by separation, whereby there was consequently obtained a water-containing resin powder E with a solid content of 65 weight %. This resin powder E was further subjected to vacuum drying in a container at 30° C. and pressure difference of −720 mmHg for 8 hours to obtain resin powder E' with a water content of 0.2%.

65% of the particles in this resin powder had particle size of from 30 to 60μ, and the average particle size was 52μ. It was also found as a result of a microscopic examination that this resin powder was composed of particles irregular in shape (such as thread- or bar-shaped).

The water-containing resin powder preparations A to E obtained in the above-described Examples and Comparative Examples were respectively mixed and agitation in water at the blends shown in Table 1 below to obtain the slurry paints A–E with a solid content of 50 weight %.

The properties of these slurry paints and the coating films obtained from spray coating thereof are shown in Table 2 below. The coating film was formed by spraying each slurry paint on a polished steel plate and then subjecting it to stove drying at 220° C. for 20 minutes in the case of slurry paints A and D, at 230° C. for 10 minutes in the case of slurry paints B and E, and at 200° C. for 20 minutes in the case of slurry paint C.

The resin powder preparations A'–E' obtained in the respective Examples and Comparative Examples were also used as powder coating materials. The properties of these powder coating materials A'–E' and coating films obtained from electrostatic spray coating thereof are shown in Table 3. The coating film was formed by applying each powder coating material on a polished steel plate by electrostatic spray coating and then subjecting it to stove drying under the same conditions as in the case of slurry paints.

Table 1

| Components | slurry paints | (parts by weight) | | | | |
|---|---|---|---|---|---|---|
| | | A | B | C | D | E |
| water-containing resin powder | Example 2 | 100 | | | | |
| | Example 4 | | 100 | | | |
| | Example 6 | | | 100 | | |
| | Comparative Ex. 1 | | | | 100 | |
| | Comparative Ex. 2 | | | | | 100 |
| Water | | 30 | 36 | 44 | 10 | 30 |
| Nonionic surface active agent | | 0.20 | 0.20 | 0.22 | 0.44 | 0.20 |

Table 2

| | Slurry paints | | | | |
|---|---|---|---|---|---|
| | A | B | C | D | E |
| Storage stability (Note 1) | 0 | 0 | 0 | 0 | X |
| Coating workability (Note 2) | 0 | 0 | 0 | Δ | X |
| Water resistance (Note 3) | 0 | 0 | 0 | X | 0 |
| Uniformity in luster of coating film (Note 4) | 0 | 0 | 0 | Δ | X |
| Smoothness (Note 5) | 0 | 0 | 0 | X | X |
| Distinctness-of-image gloss (Note 6) | 0 | 0 | 0 | Δ | Δ |
| 60° specular gloss (Note 7) | 98 | 96 | 93 | 86 | 83 |

(Note 1)
Each paint was kept in a sealed container at 35° C. for 7 days, and then a check was made on precipitation and agglomeration. 0 mark in the table indicates no precipitate or agglomerate, and X mark indicates presence of precipitates and/or agglomerates.
(Note 2)
The condition of atomization and nozzle clogging during air spray coating were examined. 0 mark indicates excellent atomization and no nozzle clogging, Δ mark indicates fairly good atomization and slight nozzle clogging, and X mark indicates poor atomization and heavy nozzle clogging.
(Note 3)
Presence or absence of blisters was examined after 10-day immersion in 20° C. tap water. 0 mark indicates no blister and X mark indicates presence of blisters of more than 5% in area ratio.
(Note 4)
Presence or absence of irregularly shimmering stops on the coating film was examined visually.
(Note 5)
Smoothness of the coating film was checked visually.
(Note 6)
Distinctness-of-image gloss of the fluorescent lamp on the coating film surface was examined visually.
(Note 7)
Measured according to ASTM D-1471.

In Note 4 to Note 6 above, each 0 mark indicates excellent coating surface condition, X mark indicates poor condition, and Δ mark indicates an intermediate condition.

Table 3

|  | Powder coating materials | | | | |
| --- | --- | --- | --- | --- | --- |
|  | A' | B' | C' | D' | E' |
| Storage stability (Note 1) | 0 | 0 | 0 | 0 | X |
| Coating workability (Note 2) | 0 | 0 | 0 | Δ | X |
| Water resistance (Note 3) | 0 | 0 | 0 | X | 0 |
| Uniformity of luster of coating film (Note 4) | 0 | 0 | 0 | Δ | X |
| Smoothness (Note 5) | 0 | 0 | 0 | X | Δ |
| Distinctness-of-image gloss (Note 6) | 0 | 0 | 0 | Δ | 0 |
| 60° specular gloss (Note 7) | 98 | 96 | 93 | 86 | 95 |

(Note 1)
Each powder coating material was kept in a sealed polyethylene bag at 25° C. under pressure of 10 g/cm² for 7 days, and then presence or absence of any hard lump or lumps was examined. 0 mark indicates no hard lump and X mark indicates presence of hard lump(s).

(Note 2)
Nozzle clogging during electrostatic spray coating was examined. 0 mark indicates no nozzle clogging, Δ mark indicates a slight degree of nozzle clogging, and X mark indicates heavy nozzle clogging.

(Note 3)
(Note 4)
(Note 5)      Same as (Note 3) to (Note 7) in Table
(Note 6)      2 above.
(Note 7)

In Note 4 to Note 6 above, O mark indicates excellent coating surface condition, X mark indicates poor condition, and Δ mark indicates an intermediate condition.

EXAMPLE 7

Figure 10:
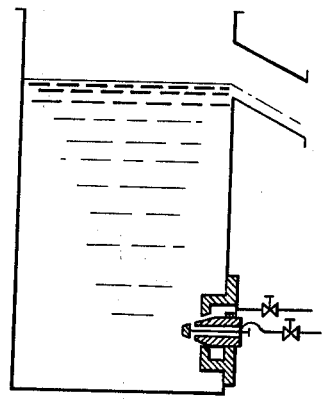
FIG. 10 shows means for adapting the invention to a continuous powder suspension method.
Figure 9:
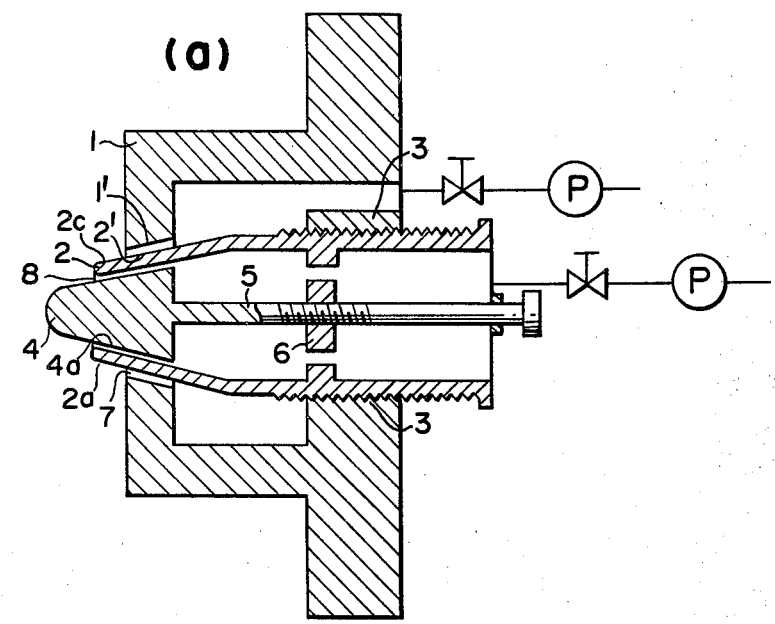
FIGS. 9 (a) and (b) are sections of two inner and outer binary fluid nozzle embodiments.
Figure 9:
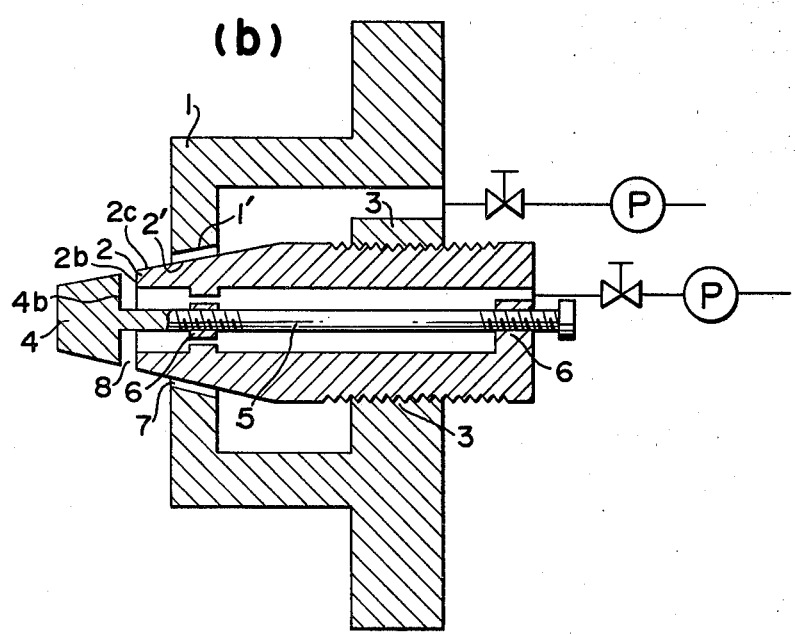

A binary fluid nozzle device having a construction such as shown in FIG. 9(a) and designed such that when the clearances 7 and 8 are adjusted to 1 mm and 0.5 mm, respectively, the areas of the outer end faces of said respective clearance will be 0.16 cm² and 0.02 cm², respectively, was set in a 200-liter-capacity powdering tank such as shown in FIG. 10. The nozzle device was connected to a tank and a resin solution tank each through a pipe and a pump so that water and said resin solution A may be injected from the clearances 7 and 8, respectively. With said both clearances 7 and 8 being closed, the powdering tank was filled with 100 liters of water and then the water supply pump was operated to set water pressure to 30 kg/cm². Thereafter, the clearance 7 was opened to the width of 1 mm to inject water at the flow rate of 40 kg/min. Then the resin solution supply pump was operated to set its feed pressure to 5 kg/cm² and the clearance 8 was opened to the width of 0.4 mm to inject the precolored resin solution at the flow rate of 3 kg/cm². The resin particles produced in the powdering tank unde this condition had an average particle size of 32μ.

Then, water pressure was adjusted to 25 kg/cm² and the clearance 7 to the width of 0.5 mm, and water was injected at the flow rate of 13.3 kg/min, while simultaneously injecting the resin solution at the flow rate of 1 kg/min under pressure of 4 kg/cm² and clearance 8 width of 0.3 mm.

The average particle size of the resin particles produced under this condition was also 32μ. When stopping powdering, the clearance 8 was first closed and then the clearance 7 was closed. After this, the powdering and stopping operations were repeated 20 times, but no nozzle clogging occured and also reproducibility of shape and particle size distribution of the produced resin particles was excellent.

EXAMPLE 8

There was used an apparatus the same as that employed in Example 7 except for the binary fluid nozzle device which had the construction such as shown in FIG. 9(b) and which was designed such that when the clearances 7 and 8 are adjusted to 1 mm and 0.5 mm, respectively, in width, the areas of the outer end faces of the respective clearances will be 0.16 cm² and 0.03 cm², respectively.

With the clearances 7 and 8 being closed, said powdering tank was filled with 100 liters of water, and by setting the opening of the clearance 7 to 0.4 mm and water pressure to 40 kg/cm², water was injected at the flow rate of 20 kg/min, followed by injection of the resin solution at the flow rate of 2 kg/min under pressure of 4 kg/cm² and with a clearance 8 opening of 0.4 mm.

The resin particles produced under this condition had an average particle size of 25μ. Then the water pressure was raised to 50 kg/cm² and the clearance 7 was widened to 0.6 mm, and under this condition water was injected at the flow rate of 40 kg/min while the resin solution was simultaneously injected at the flow rate of 4 kg/min under pressure of 8 kg/cm² and with a clearance 8 opening of 0.5 mm. The average particle size of the resin particles produced under this condition was 25 μ.

Such powdering operation and stoppage were repeated after the manner of Example 7, but no nozzle clogging occurred and reproducibility of powdering was splendid.

What is claimed is:

1. A method of producing powder in which at least 80% of the powder has particle size between 5 and 35μ, from a resin selected from the group consisting of phenol resins, amino resins, epoxy resins, acrylic resins, polyester resins, polyurethane resins, vinyl chloride resins, consisting of:

(a) directing a stream of solution of said resin dissolved in a water miscible solvent, said resin being insoluble in water, wherein the solid concentration of said resin solution is from 20 to 75 weight % and the solubility of said water miscible solvent in water is greater than 3 weight %, from a first nozzle orifice into a stream of water jetted from a second nozzle orifice disposed adjacent to said first nozzle, wherein the feed pressure of the resin solution from the first nozzle orifice is from 1 to 30 kg/cm² and the feed pressure of water from said second nozzle orifice is from 5 to 50 kg/cm², said directing of said stream of resin solution being performed directly and simultaneously with the jetting of water so that said solution is subdivided into droplets separated by said water, (b) adjusting the ratio of solvent in said resin solution to water to between 1:5 and 1:40 by weight whereby the water-miscible solvent in said droplets is extracted by said water, and the solubility of the resin in the solvent is decreased to, thereby produce said resin powder in suspension in the mixture of water and said solvent, and (c) separating the thus produced resin powder from the mixture of solvent and water by filtration.

2. The method according to claim 1 wherein step (b) water is added to the mixture of resin solution and said water and the ratio of solvent to the total amount of water is between 1:5 and 1:40.

3. A method of producing resin powder according to claim 1 wherein said solution of resin is directed from a first nozzle and said water is jetted from a second nozzle by using an integrated adjustable binary fluid nozzle assembly.

4. A method of producing resin powder according to claim 1 wherein the boiling point of said water-miscible solvent is lower than 100° C.

5. A method of producing resin powder according to claim 1 wherein the softening point of the resin used for preparing said resin solution is from 30° to 110° C.

6. A method of producing resin powder according to claim 1, wherein said separation of the resin powder in step (c) said suspension of the resin powder is discharged onto a continuously moving endless filter cloth conveyor while sucking the moisture from the back side of said filter cloth conveyor to filter out the liqud phase in said suspension.

7. The method according to claim 1 wherein in step (a) said first and second nozzles are arranged so that the directions of ejections from the orifices thereof are substantially parallel.

8. The method according to claim 1 where in step (a) said first and second nozzles are arranged so that the directions of ejections from the orifices thereof cross each other.

9. The method according to claim 1 which is carried out continuously.

10. The method according to claim 1 wherein after step (c) the resin powder is washed with water.

11. The method according to claim 1 wherein at least one member selected from the group consisting of plasticizers, pigments, extenders, dyes, curing agents, fluidity regulators and stabilizers is added to said resin solution prior to step (a).

* * * * *